United States Patent [19]

Johnson et al.

[11] Patent Number: 5,023,590

[45] Date of Patent: Jun. 11, 1991

[54] 17-BIT CASCADABLE COMPARATOR USING GENERIC ARRAY LOGIC

[75] Inventors: John R. Johnson, Laguna Hills; Melvin W. Thexton, La Palma, both of Calif.

[73] Assignee: Loral Aerospace Corp., New York, N.Y.

[21] Appl. No.: 446,965

[22] Filed: Dec. 6, 1989

[51] Int. Cl.[5] .............................................. E06F 7/02
[52] U.S. Cl. .................................................. 340/146.2
[58] Field of Search ... 340/146.2, 728.03, 200 MS File, 340/900 MS File

[56] References Cited

U.S. PATENT DOCUMENTS

| | | | |
|---|---|---|---|
| 4,031,511 | 6/1977 | Britton | 340/146.2 |
| 4,225,849 | 9/1980 | Lai | 340/146.2 |
| 4,495,590 | 1/1985 | Mitchell, Jr. | 364/716 |
| 4,536,738 | 8/1985 | Huse et al. | 340/146.2 |
| 4,602,349 | 7/1986 | Blackley et al. | 340/146.2 |
| 4,721,868 | 1/1988 | Cornell et al. | 307/465 |
| 4,742,252 | 5/1988 | Agrawal | 307/465 |
| 4,752,763 | 6/1988 | Hoffman | 340/146.2 |
| 4,758,747 | 7/1988 | Young et al. | 307/465 |
| 4,760,374 | 7/1988 | Moller | 340/146.2 |

Primary Examiner—Gary V. Harkcom
Assistant Examiner—Long T. Nguyen
Attorney, Agent, or Firm—Harry G. Weissenberger; Edward J. Radlo; Keith L. Zerschling

[57] ABSTRACT

A cascadable seventeen-bit self-testing comparator (20) is produced on a twenty-four pin GAL® 39V18 generic array logic chip by so interconnecting the data pins (1–17) with the logic macro cells (24a–h, 26a–i), and configuring the macro cells, that any data applied to the pins is registered in the macro cells (24a–h, 26a–i) upon pulsing the clock (35), and any exact coincidence of subsequent data with the registered data causes one of the macro cells (26j) to generate a match-indicating output (61).

6 Claims, 3 Drawing Sheets

17-BIT CASCADABLE COMPARATOR USING GENERIC ARRAY LOGIC

FIELD OF THE INVENTION

This invention relates to digital comparators, and more specifically to a self-checking comparator which is software-constructed from twenty-four pin generic array logic and provides on-board storage for fast comparison of seventeen bits on one chip.

BACKGROUND OF THE INVENTION

In applications such as, for example, infrared detector arrays, it is desirable to handle cell address data at very fast rates, in various sequences, and for arrays of different sizes and configurations, with a minimum of hardware. Address manipulation conventionally involves the use of digital comparators which continually compare addresses appearing on an address bus with pre-stored addresses at which certain actions are to be taken.

Conventional comparators for large arrays typically involve many integrated circuit chips, sometimes require hardware changes to accommodate different references for different arrays, and are comparatively slow because each address needs to be loaded into the comparator, compared, and an output generated in separate operational cycles.

Prior art in this field is as follows: U.S. Pat. No. 4,031,511 to Britton, which shows a CMOS comparator made up of discrete components and integrated circuits; U.S. Pat. No. 4,225,849 to Lai, which discloses a tree-type comparators; U.S. Pat. No. 4,495,590 to Mitchell, Jr., which describes a one-time programmable solid state logic device; U.S. Pat. No. 4,536,738 to Huse et al., which describes a macro cell arrangement for programmable array logic; U.S. Pat. No. 4,721,868 to Cornell et al., which shows a scheme for time multiplexing of programmable array logic inputs; U.S. Pat. No. 4,742,252 to Agrawal, which discloses a programmable logic device; U.S. Pat. No. 4,752,763 to Hoffman, which discusses an emitter coupled logic device comparator; U.S. Pat. No. 4,758,747 to Young et al., which describes a buried register circuit; and U.S. Pat. No. 4,760,374 to Moller, which shows an emitter coupled logic bounds checker.

SUMMARY OF THE INVENTION

The present invention provides a versatile, easily programmable comparator which is constructed entirely by software from a standard off-the-shelf generic array logic device such as a GAL ® 39V18 chip manufactured by Lattice Semiconductor Corporation of Portland, Oreg. Generic array logic typically provides a set of flip-flops and associated gates which can be selectively and modifiably interconnected by software in the form of a JEDEC file.

In the case of the above-mentioned 39V18 chip, the eighteen registers of the chip can be programmed, in accordance with the invention, to provide a 17-bit comparison in a single chip, without using any external registers. An eighteenth bit is available for the cascading of other chips. In practical terms, this means that address matrixes as large as 360×360 can be compared by a single chip.

In addition, the comparator of this invention needs no loading of addresses to be compared; whenever the address data on the bus matches an internally stored address, a "match" output is instantly produced and maintained as long as the matching address is on the bus.

Also, the device is self-testing: whenever a new reference address is clocked into the comparator, the presence of the reference address on the bus as it is being clocked into storage produces a "match" output if the comparator is functioning properly.

DESCRIPTION OF THE PREFERRED EMBODIMENT

The invention is basically concerned with the creation of a cascadable seventeen-bit comparator from an off-the-shelf twenty-four pin generic array logic device (a task which would normally require more than thirty-five pins). A suitable device for this purpose is the above-mentioned GAL ® 39V18 generic array logic chip, on which eighteen pins are available for data handling purposes.

Figure 1:
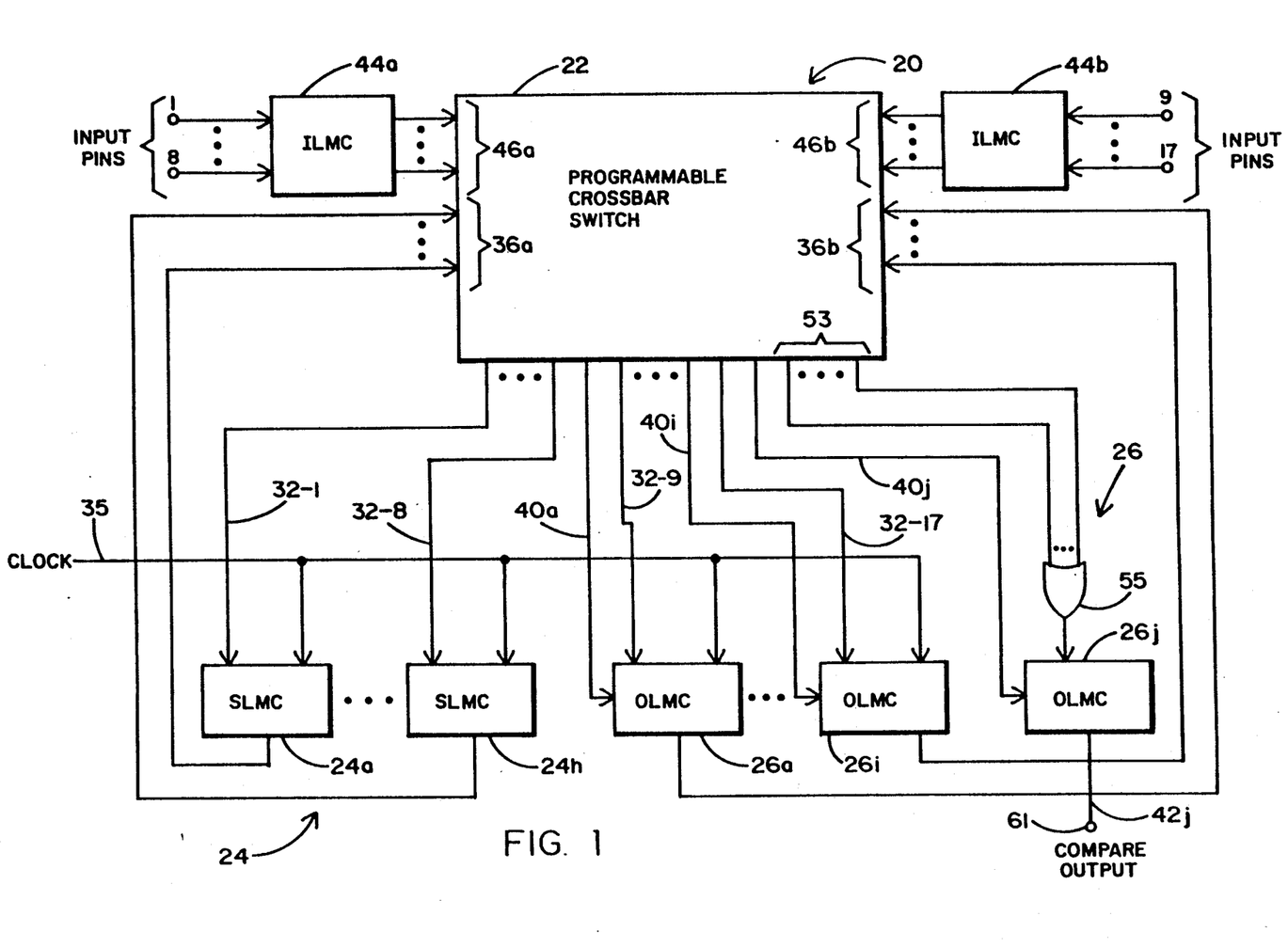
FIG. 1 is a block diagram of a generic logic array configured in accordance with the invention.
Figure 2:
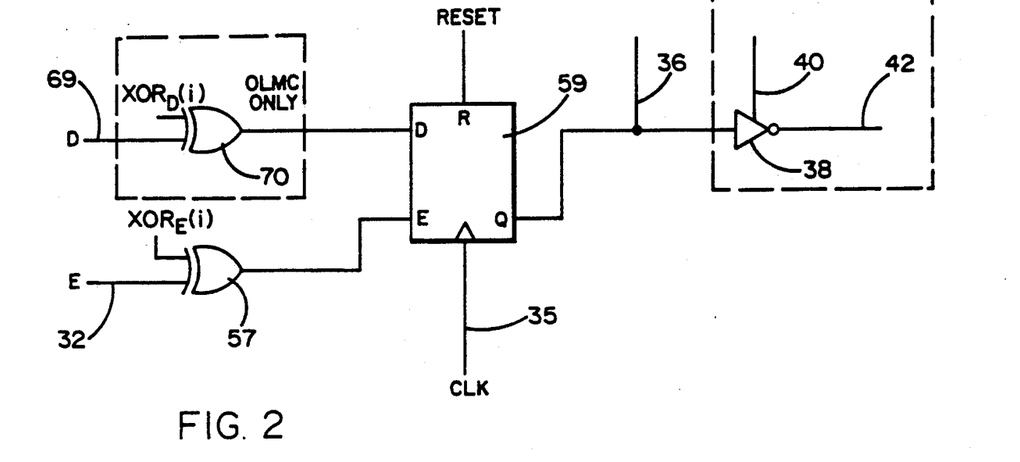
FIG. 2 is a block diagram of a state or output logic macro cell configured in accordance with the invention.

FIG. 1 is a block diagram of those elements of the 39V18 chip 20 which are used in the inventive configuration of the programmable crossbar switch 22 by the JEDEC file discussed below. The chip 20 contains eight configurable state logic macro cells (SLMCs) 24a through 24h and ten configurable output logic macro cells (OLMCs) 26a through 26j. The SLMCs 24a through 24h are known as buried registers. The internal structure of the SLMCs 24a through 24h and OLMCs 26a through 26i, when software configured as D/E type registers in accordance with 39V18 chip specifications, is illustrated in FIG. 2. In that figure, the elements in dotted lines are present in the OLMCs 26 but not in the SLMCs 24.

With a permanent "0" at the D input 28 (if present), the flip-flop 30 stores the condition of the E input 32 at its Q output 34 whenever the clock 35 is pulsed. The stored value is fed to the crossbar switch input 36. The tri-state inverter 38, which also operates as a switch, is configured in a permanently open condition over lines 40a through 40i on OLMCs 26 through 26i, but in a permanently closed position over line 40j on OLMC 26j. Consequently, the OLMC output lines 42 to pins 9 through 17 are disconnected, thereby making pins 9 through 17 (like pins 1 through 9) input pins only. The output line 42j of OLMC 26j remains connected and constitutes the output of the comparator 10.

For data comparison purposes, the input logic macro cells 44a and 44b are simply transparent so as to produce inputs 46a, 46b of data to be compared. Within the crossbar switch 22, the inputs 46a and 46b are available either directly or inverted from inverters 48 (FIG. 3).

Figure 3:
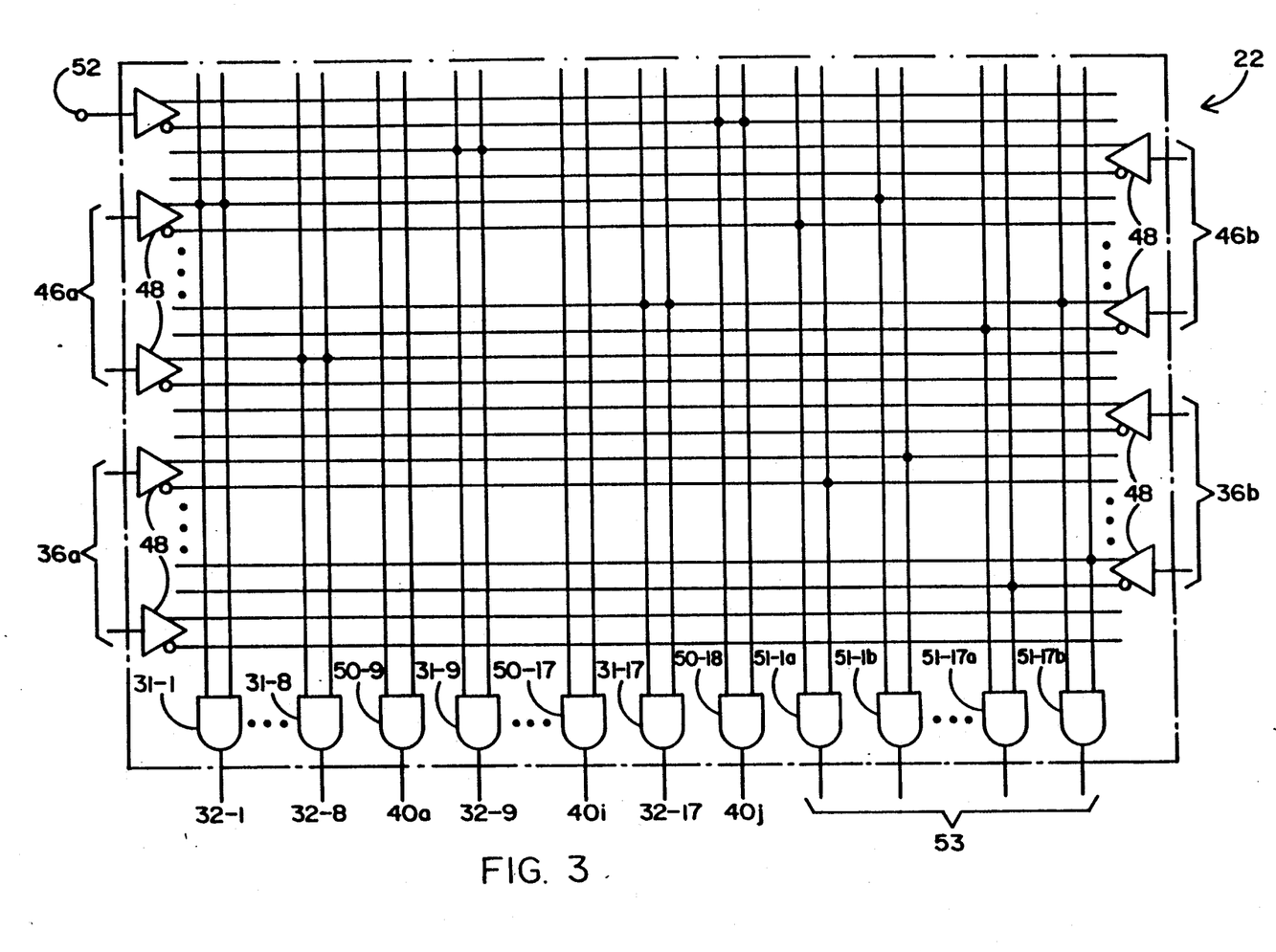
FIG. 3 is a schematic diagram of the crossbar switch.

Inside the crossbar switch 22, as shown in FIG. 3, the JEDEC file of this invention connects pins 1 through 17 via inputs 46a, 46b and transparently connected output AND gates 31-1 through 31-17 to the E inputs 32 (FIG. 2) of SLMCs 24a through 24h and OLMCs 26a through 26i, respectively. The tri-state inverters 38 of OLMCs 26a through 26i are held open by the "0" output of internally unconnected AND gates 50-9 through 50-17.

The OLMC 26j, which provides the output of the comparator 20, receives its E input 32 (FIG. 2) from seventeen pairs of AND gates 51-1a through 51-17b (FIG. 3) whose outputs 53 are OR'd together in OR gate 55. The 'a' gate of each pair receives its inputs from the uninverted outputs of an inverter 48 at 46a or 46b anbd a corresponding inverter 48 at 36a or 36b. The "b" gate of each pair receives the inverted outputs of the same inverters 48. Because the SLMCs 24a through 24h and the OLMCs 26a through 26i store the inverse of the data at pins 1 through 17 when clocked, a subsequent match of the input data and the stored data will produce a "0" at the output of both the "a" and the "b" gate, while a mismatch will produce a "1" on either the "a" gate or the "b" gate.

The OLMC 26j is software-configured in accordance with the specifications of the 39V18 chip to operate as a combinatorial output device, in which the output of EXCLUSIVE-OR gate 70 (FIG. 2) is applied directly to the tri-state inverter 38.

Inasmuch as the outputs 53 are OR'd by the OR gate 55, the OR gate 55 will put out a "0" only when all seventeen data digit pairs match. When applied to the D input 69 (FIG. 2) of OLMC 26j, this "0" is inverted by EXCLUSIVE-OR gate 70 into a "1" at the input of tri-state inverter 38 (which in OLMC 26j is enabled from the inverted unused clock 52, FIG. 3, through AND gate 50-18 and line 40j). Thus, a match between the input data and the stored data produces a "0" on the compare output pin 61 which terminates line 42j.

The operation of the comparator of this invention is as follows: A reference address is entered into the comparator by applying it to the input pins 1 through 17 and pulsing the clock 35. Thereafter, whenever (and as long as) an address applied to pins 1 through 17 matches the reference address, the compare output 42j is "0". At all other times, the compare output 42j is "1". When more than seventeen bits need to be compared, comparators of this invention can be cascaded in several ways, for example by using the output 61 of one chip 20 as one of the inputs to the next chip 20.

It should be noted that the device of this invention is self-testing: As soon as the clock 35 is pulsed to load a reference address, a "0" appears at the compare output 61 if the comparator is operating properly.

Figure 4:
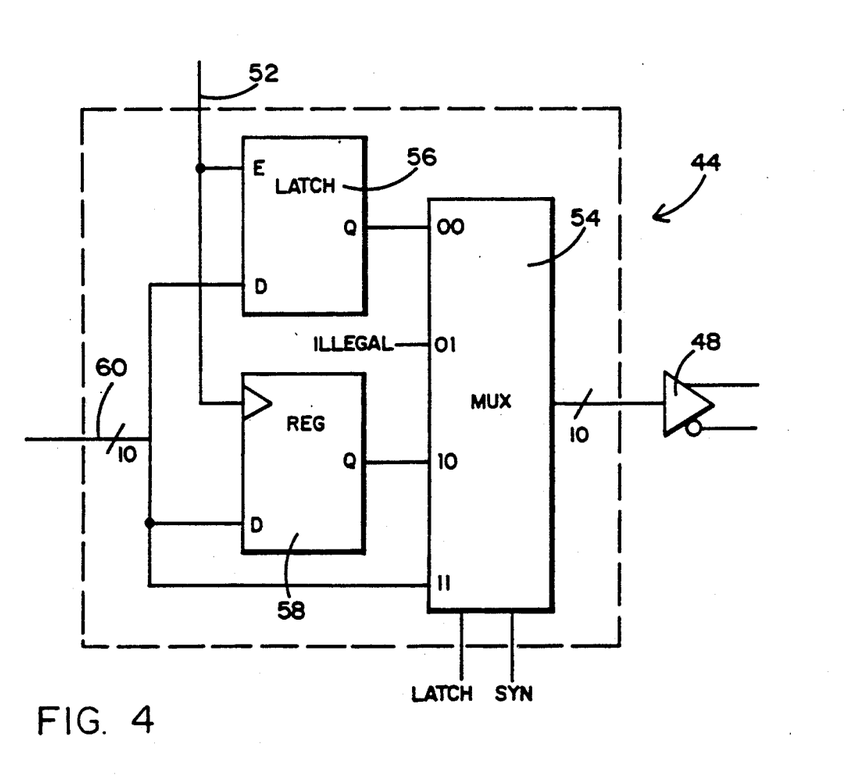
FIG. 4 is a block diagram of an input logic macro cell allowing various modes of operation of the inventive comparator.

FIG. 4 illustrates the input logic macro cells (ILMCs) 44. In the preferred operational mode described above, the clock 52 is disabled, and the multiplexer 54 connects the input pins 1–17 directly to the inverters 48 of the crossbar switch 22. If it is desired to hold a compare indication beyond the time during which an address is applied to the pins 1–17, the clock 52 can be activated to enable the latch 56 and register 58 to hold any address appearing on the pin inputs 60.

The connections inside the crossbar switch 22 of the 39V18 chip 20 which configure the chip 20 as described above are established by loading the following JEDEC file through a conventional logic array programmer.

```
111  , 111111111111111111111111*
V0001 X0011010001N1H010000101N*
V0002 X0011010001N&L10100010lN*
V0003 X0010011101N1H0010100000N*
V0004 X0001111111N1H0011100011N*
V0005 X0001010101N1H010101010N*
V0006 X0011010001N1L10100010lN*
V0007 X0011010001N1H010000110N*
V0008 X0000101010N1H101010101N*
C044D*
^CA6EF

1ABEL(tm) 3.00a FutureNet Div, Data I/O Corp.  JEDEC file for: F39V18
Created on: 15-Apr-88 08:16 AM
MTG TIMING JOHN R. JOHNSON           FORD AEROSPACE CORPORATION  14 APRIL 88*
QP24* QF8297* QVB*

L0000
```

[binary data matrix omitted]

```
0101
1000
1000
1000
1000
1000
1000
1000
1000*
L8...
1111*
L8222
11111111111111111111111111111111*
L8262
111111111111111111111111111111111*
V0001 X0011010001N1H10100010N*
V0002 X0011010001NKL10100010N*
V0003 X0010011101N1H0010000N*
V0004 X0001111111N1H0011001N*
V0005 X0001010101N1H01010101N*
V0006 X0011010001N1L10100010N*
V0007 X0011010001N1H10100010N*
V0008 X00001010101N1H10101010N*
C044D*
^CA6EF

1ABEL(tm) 3.00a FutureNet Div, Data I/O Corp. JEDEC file for: F39V1B
Created on: 15-Apr-88 08:16 AM
MTG TIMING JOHN R. JOHNSON          FORD AEROSPACE CORPORATION   14 APRIL 88*
QP24* QF8297* QVB*
L0000
```

```
0000000000000000000000000000000000000000000000000000000000000
0000000000000000000000000000000011111111111111111111111111111
1111111111111111111111111111111111111111111111111111111111111
0000000000000000000000000000000000000000000000000000000000000*
LB154
100
100
100
100
100
10O
100*
LB178
0101
1000
1000
1000
1000
1000
1000
1000*
LB218
1111*
LB222
1111111111111111111111111111111111.1111111111*
LB262
1111111111111111111111111111111111111111111*
V0001  X0011010001N1H101000101N*
V0002  X0011010001NKL101000101N*
V0003  X0010011101N1H001010000N*
V0004  X0001111111N1H001110011N*
V0005  X0001010101N1H010101010N*
V0006  X0011010001N1L101000101N*
V0007  X0011010001N1H101000110N*
V0008  X0000101010N1H101010101N*
C044D*
^CA6EF
```

We claim:

1. A cascadable self-testing comparator chip, comprising:
   (a) a generic logic array chip including a pulsable clock, a plurality of input pins, a plurality of logic macro cells, and a programmable crossbar switch for selectably interconnecting the same;
   (b) first interconnections programmed into said crossbar switch to connect said input pins to said macro cells, said macro cells being configured as registers storing data applied to said pins when said clock is pulsed;
   (c) an output pin;
   (d) an additional macro cell having its input connected to said crossbar switch and having its output connected to said output pin; and
   (e) second interconnections programmed into said crossbar switch to produce a predetermined logic level at said input of said additional macro cell when the data applied to said input pins matches the data stored in said plurality of logic macro cells, said additional macro cell being configured to produce a predetermined output at said output pin in response to said predetermined logic level being produced at the input of said additional macro cell.

2. The chip of claim 1, in which said predetermined logic level is "0".

3. The chip of claim 1, in which said plurality of logic macro cells are configured as D/E registers, and said additional macro cell is configured as a combinatorial output device.

4. The chip of claim 1, in which said second interconnections are such as to create a plurality of elements arranged to generate a "0" whenever a data bit applied to one of said input pins matches the data bit stored in the corresponding one of said plurality of logic macro cells, the outputs of said elements being OR'd together to form the input of said additional macro cell.

5. The chip of claim 1, further comprising selectable latch means for latching the data bits applied to said input pins for a predetermined interval.

6. The chip of claim 1, in which said generic logic array chip is a 39V18 chip.

* * * * *